Figure 1:
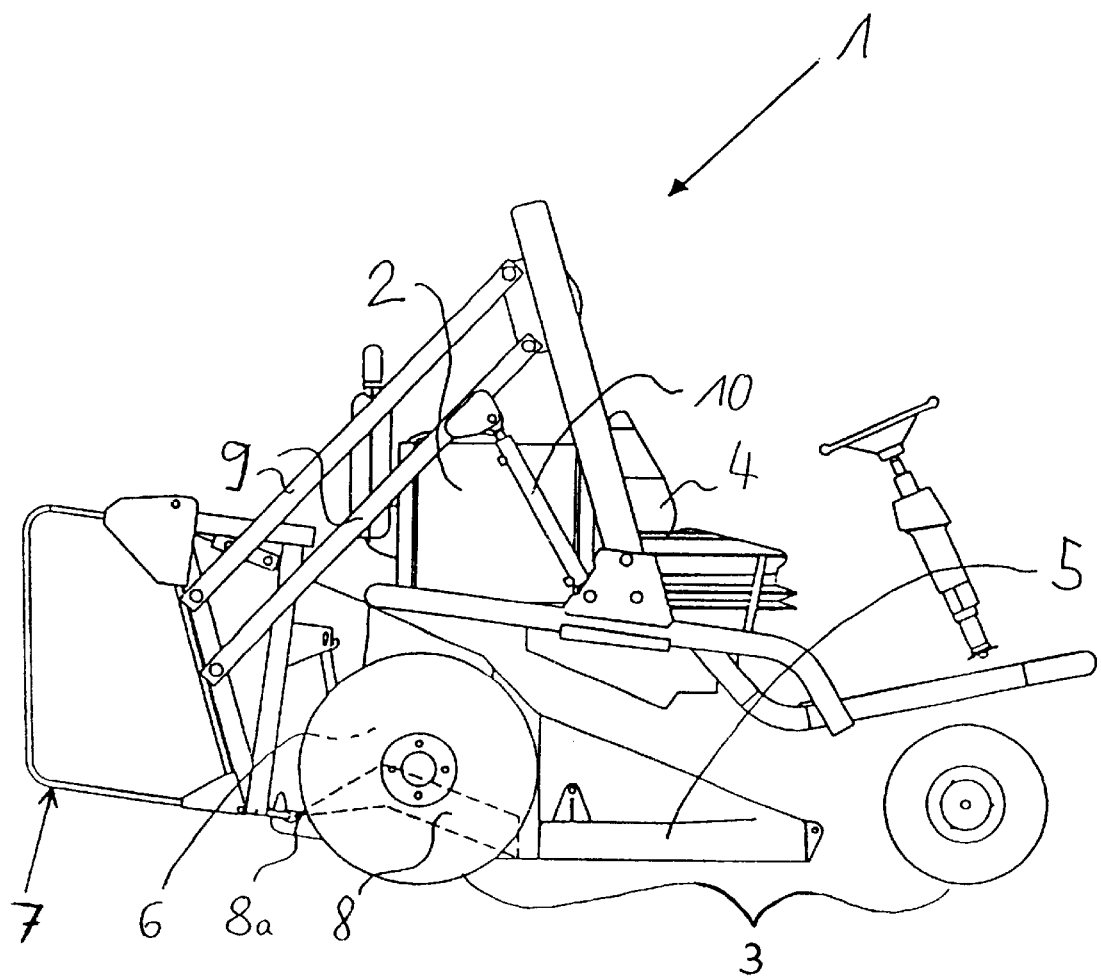

United States Patent [19]

Chabrier et al.

[11] Patent Number: 6,050,072
[45] Date of Patent: Apr. 18, 2000

[54] RIDING LAWNMOWER COMPRISING PARTICULARLY A COLLECTOR FOR CUT GRASS

[75] Inventors: Adrien Chabrier, Lembach; Alfred Schmitt, Lampertsloch, both of France

[73] Assignee: ETESIA (Societe a Responsabilite Limitee), Wissembourg, France

[21] Appl. No.: 09/085,002

[22] Filed: May 28, 1998

[30] Foreign Application Priority Data

May 28, 1997 [FR] France ................................ 97 06722
Aug. 29, 1997 [FR] France ................................ 97 10920

[51] Int. Cl.[7] .................................................. A01D 34/70
[52] U.S. Cl. ............................................ 56/202; 56/16.6
[58] Field of Search ................................ 56/13.3, 16.6, 56/16.8, 202, 320.2, 199, DIG. 9, DIG. 18

[56] References Cited

U.S. PATENT DOCUMENTS

| | | |
|---|---|---|
| 3,247,990 | 4/1966 | Prescott . |
| 4,478,031 | 10/1984 | Wolf .......................................... 56/202 |
| 4,637,203 | 1/1987 | Fedeli ........................................ 56/202 |
| 4,726,177 | 2/1988 | McGoughy ................................ 56/202 |
| 4,800,712 | 1/1989 | Morse et al. .............................. 56/202 |
| 5,921,073 | 7/1999 | Cash .......................................... 56/202 |

FOREIGN PATENT DOCUMENTS

| | | |
|---|---|---|
| 282 007 | 3/1966 | Australia . |
| 0 155 437 | 9/1985 | European Pat. Off. . |
| 2 637 450 | 4/1990 | France . |
| 29 50 709 | 6/1981 | Germany . |
| 44 03 353 | 8/1995 | Germany . |
| 3-004714 | 1/1991 | Japan . |
| WO 92/13438 | 8/1992 | WIPO . |

Primary Examiner—Robert E. Pezzuto
Attorney, Agent, or Firm—Young & Thompson

[57] ABSTRACT

A riding mower (1) comprising a cutting device (6) which moves cut grass through a rearwardly extending connection conduit (6) into a rear collector (7) for cut grass, and wherein for emptying, the collector (7) is pivotally mounted and adapted to be detached from the connection conduit (6). A movable flap (8) is disposed in the region of the connection conduit (6) and in one embodiment is mounted on the collector (7) and upon disengagement of the collector (7) from the connection conduit (6) and pivoting the collector (7), the flap (8) can be moved into a position closing the collector (7). In another embodiment, the flap (8) is mounted on the connection conduit (6) and at least the portion of the connection conduit (6) on which the flap is mounted follows the movement of the collector (7) during emptying of the collector (7).

17 Claims, 5 Drawing Sheets

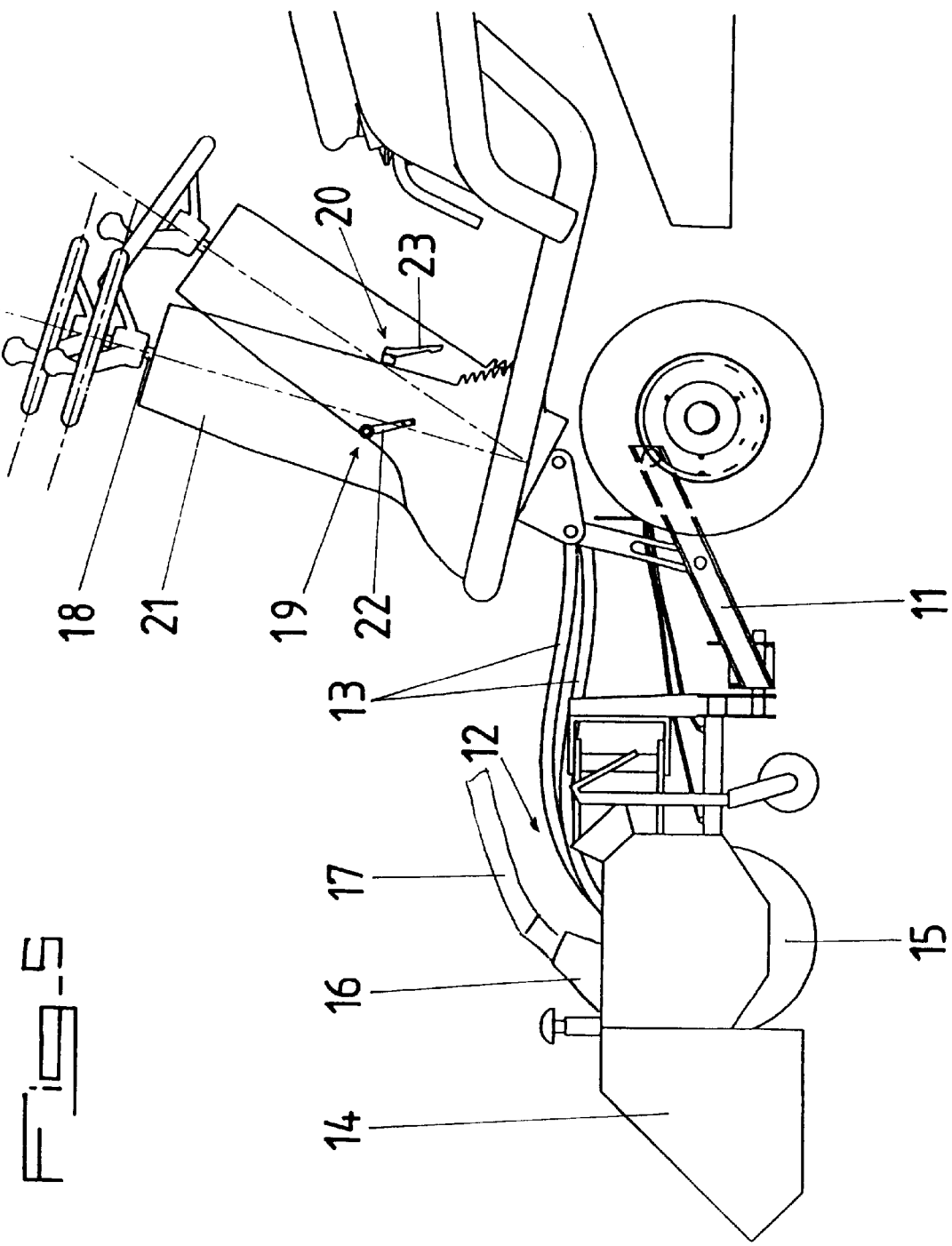

RIDING LAWNMOWER COMPRISING PARTICULARLY A COLLECTOR FOR CUT GRASS

This application corresponds to French application 97 06722 of May 28, 1997 and French application 97 10920 filed Aug. 29, 1997, the disclosures of which are incorporated herein by reference.

The invention relates to a riding mower comprising a cutting device which brings the cut grass through a connecting conduit extending rearwardly into a collector for cut grass, wherein to empty it, the collector is mounted pivotally so as to be adapted to be disengaged from the connecting conduit, and wherein a movable flap is disposed in the region of the connecting conduit.

There are known riding mowers in many embodiments, which are used to mow large surfaces of lawn. The collection and disposal of cut grass whose volume is proportional to the surface of the lawn, pose a problem. Generally, a collector is provided for this purpose on the riding mower, in which the cut grass is brought by rotating blades from the cutting device or, which is more costly, by a fan provided especially for this effect. It is important to introduce the cut grass into the collector as high as possible, otherwise its opening from the cutting device will become plugged, at the same time that a large part of the collector will remain empty.

The cutting device and the collector are most often connected by a conduit which, when the collector is disposed directly at the height of the cutting device, can also be omitted or be integrated into the collector.

In the case of another construction, a flap is provided on the connecting conduit which, when the collector is in place, is open, so that the cut grass can travel from the cutting device to the collector. When the collector is removed, this flap closes to prevent the undesired ejection of cut grass while the cutting device continues to turn.

The drawback of the previously known constructions is that upon detaching the collector, a certain quantity of cut grass falls from the latter and other cut grass remains in the connecting conduit between the cutting device and the collector. This is true both for riding mowers having an upper ejection system, in the case of which the collector, to be emptied, is raised by means of a raising device and its content poured into containers or high-walled trucks, as well as those normally emptied at the level of the ground.

Accordingly, the object of the invention consists in improving the riding mower and particularly its collector, such that the collector will be easier to handle, particularly by avoiding cut grass falling from the collector when the latter is detached from the riding mower, and by correspondingly providing that the collector itself receives the rest of the cut grass remaining in the connecting conduit. Moreover, it is necessary that the riding mower and its collector be distinguished by a reliable operation throughout, whilst preserving a simple construction, little subject to disturbances and desirable from a point of view of cost, and particularly that they be adapted to high unloading.

According to the invention, this object is achieved by the fact that the flap is mounted on the collector and, to be able to disengage this latter from the connecting conduit by pivoting it, can be displaced into a closed position ensuring closure of the collector.

The arrangement of the flap on the collector itself can be carried out such that the flap which is mounted in the case of known constructions on the cutting device or integrally with the connecting conduit attached to this latter, will instead be fixed on the collector. Another solution consists in leaving the known flap in the location where it is mounted and in providing a second flap on the collector.

The fact that the flap closes the collector after, during and if desired before the latter is disengaged from the connecting conduit by pivoting it, reliably prevents the cut grass from accidentally leaving. The collector can then be pivoted or be displaced as desired, which is above all advantageous in the case of constructions with high emptying.

It is particularly advantageous to arrange the flap such that, during closing, it displaces the cut grass which is located in the connecting conduit, toward the collector. On the one hand, the connecting conduit is thus easily cleaned and, on the other hand, its internal volume is at least partially and preferably entirely used to collect cut grass.

The flap particularly effectively brings the cut grass remaining in the connecting conduit, toward the collector when the contour of the flap corresponds substantially to the internal cross section of the connecting conduit. The volume of grass located in the conduit is then pushed into the collector over all the width of the conduit and on this occasion, if desired, is compacted.

If the flap is applied in a movable manner with its free end against the connecting conduit or against the frame of the cutting device, it is possible to adjust the cutting height of the cutting device by displacing it relative to the collector which if desired can be full and hence heavy, as to which collector it is thus unnecessary to modify the position during adjustment of height.

The flap is preferably connected to a device which, when the collector is disengaged from the riding mower, passes automatically from the open position to the closed position. This control for the displacement of the flap is preferably disposed on the collector and embodied as a hydraulic system.

From the point of view of construction, it is particularly advantageous that the flap in the open position serves the function of a lateral wall, particularly of a bottom wall, of the connection conduit and that the flap be mounted pivotally on the lower edge of the opening where the collector discharges. This permits optimum disengagement from the conduit.

Particularly when the flap serves as the bottom of the connection conduit, it is desirable that it swings rearwardly of the cutting device toward the collector. This moves the cut grass upwardly in the conduit, so that it enters as high as possible into the collector and thus permits optimum filling of the latter.

The construction according to the invention is particularly good for riding mowers comprising a high emptying device. The closing of the collector by means of the flap permits great variability in the sequence of movements of the collector during emptying. This is also particularly desirable when at that time pivoting movements take place, which are due to parallelogram lever arms provided with jacks.

To empty the collector, it suffices to open the flap; there is however obtained a large emptying section and hence more rapid emptying and decrease in the working time when the collector is divided into a frame part and a pivoting rear part. The frame part then preferably has an assembly member for the end of the connection conduit which is associated with it. The rear part is largely comprised by a material permeable to air to guarantee evacuation of air carried along with the cut grass.

An alternative to arrangement on the collector consists, within the scope of the invention, in mounting the flap naturally on the connecting conduit or on a portion of the latter when the connecting conduit or said portion of the latter follows the movement of the collector during emptying. The connecting conduit then forms a part of the collector properly so called.

According to another characteristic of the invention, the mower can be provided moreover with a front assembly for mounting of tools, such as a brush, a snow plow or a front blade, whose in- or out-of-service positions are controlled by the driver by means of a central control and are carried out by mechanical, hydraulic or pneumatic means connected to the central device for pneumatic or hydraulic distribution or to a mechanical control. Thus, it is possible to provide a multi-use machine also having use in other fields of endeavor over large surfaces, such that its unit cost will be particularly reduced.

In the case of use as a sweeper with a rotating brush driven by a hydraulic or pneumatic motor, the latter can preferably be provided with suction means for the swept debris consisting of a fan, also driven hydraulically or pneumatically, sucking up said debris directly into the sweeping region and compelling the debris through a connecting conduit into the collector. So as to avoid throwing up dust around the collector, this latter is provided, at its junction with the connection of the conduit to the turbine, with a filtering and dust precipitation means, in the form of a plate filter or a centrifuge.

According to another characteristic of the invention, the steering column of the mower can be provided with inclination and height adjustment means of the steering column. Such an embodiment permits fine adaptation of the driving conditions to the anatomy of the conductor and thereby permits the latter to assume an optimum driving posture.

The inclination adjustment means of the steering column is preferably in the form of a circular sector provided with a post fixed to the interior of the casing of said steering column, on a chassis element of the mower, and coacting with a locking device secured to the casing and actuated by a lever or the like mounted outside the casing, this latter and the steering column being mounted on the chassis with the possibility of pivoting in a vertical plane having a longitudinal axis.

The height adjustment means of the steering column is preferably constituted by a gripping blocking device provided on the guide sleeve of an upper sliding element of the steering column, said device being actuated by means of a manipulating lever provided on the casing of the steering column.

Figure 2:
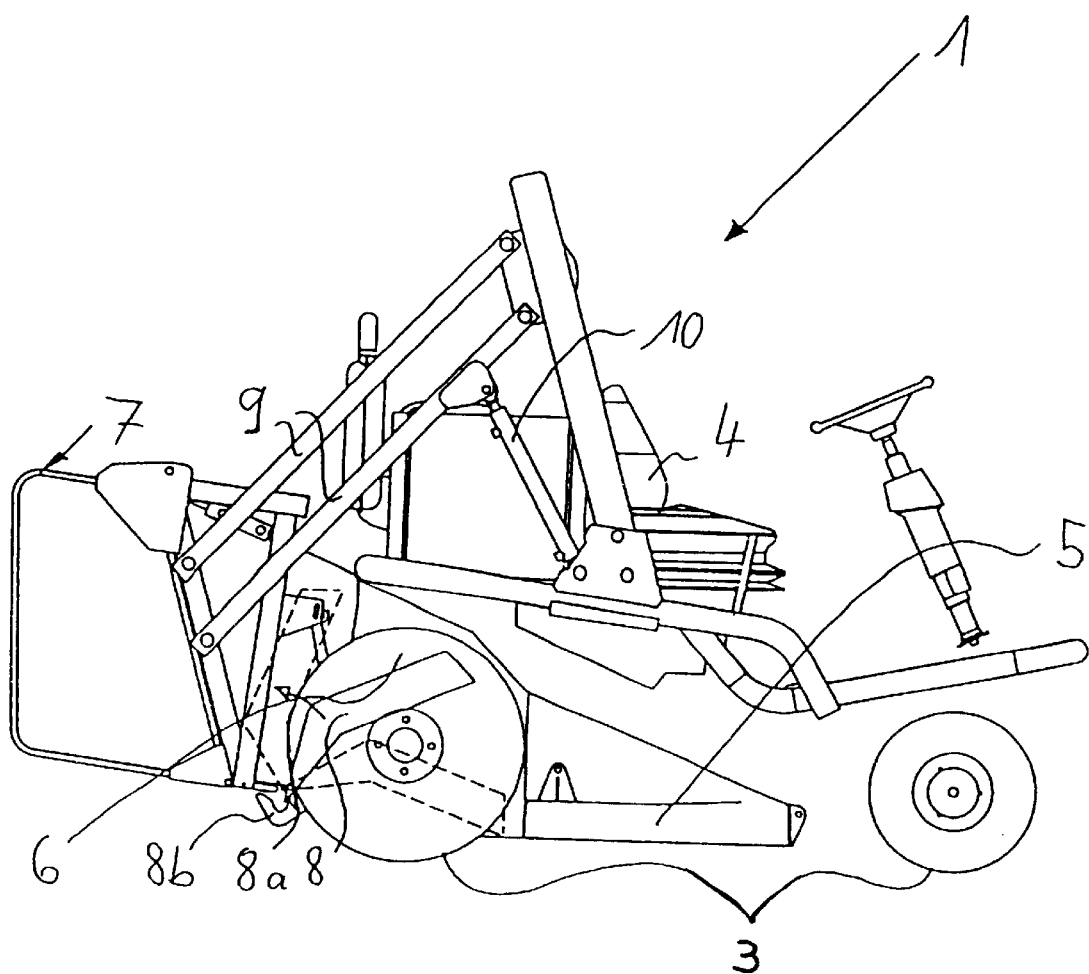
Figure 3:
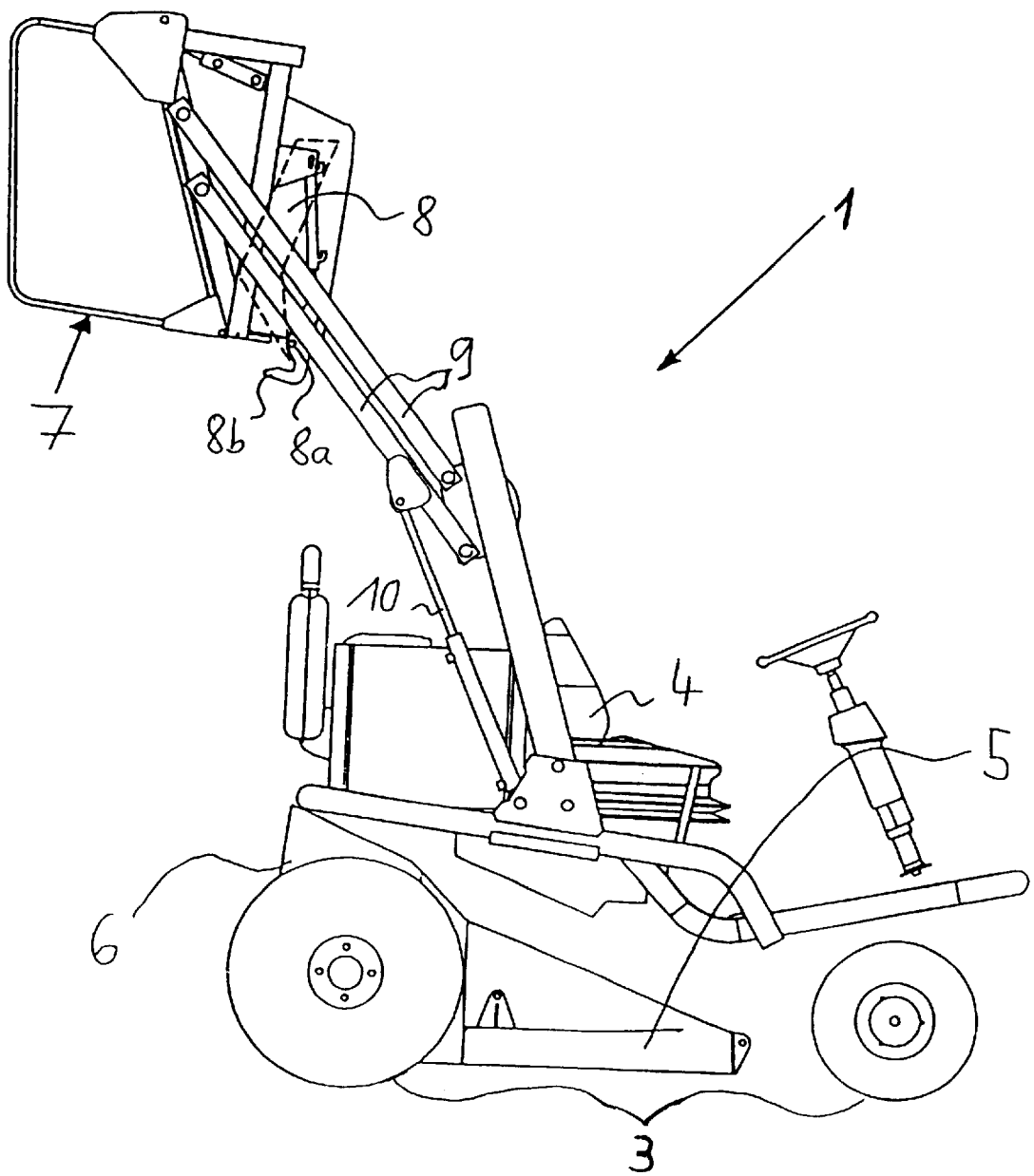
Figure 4:
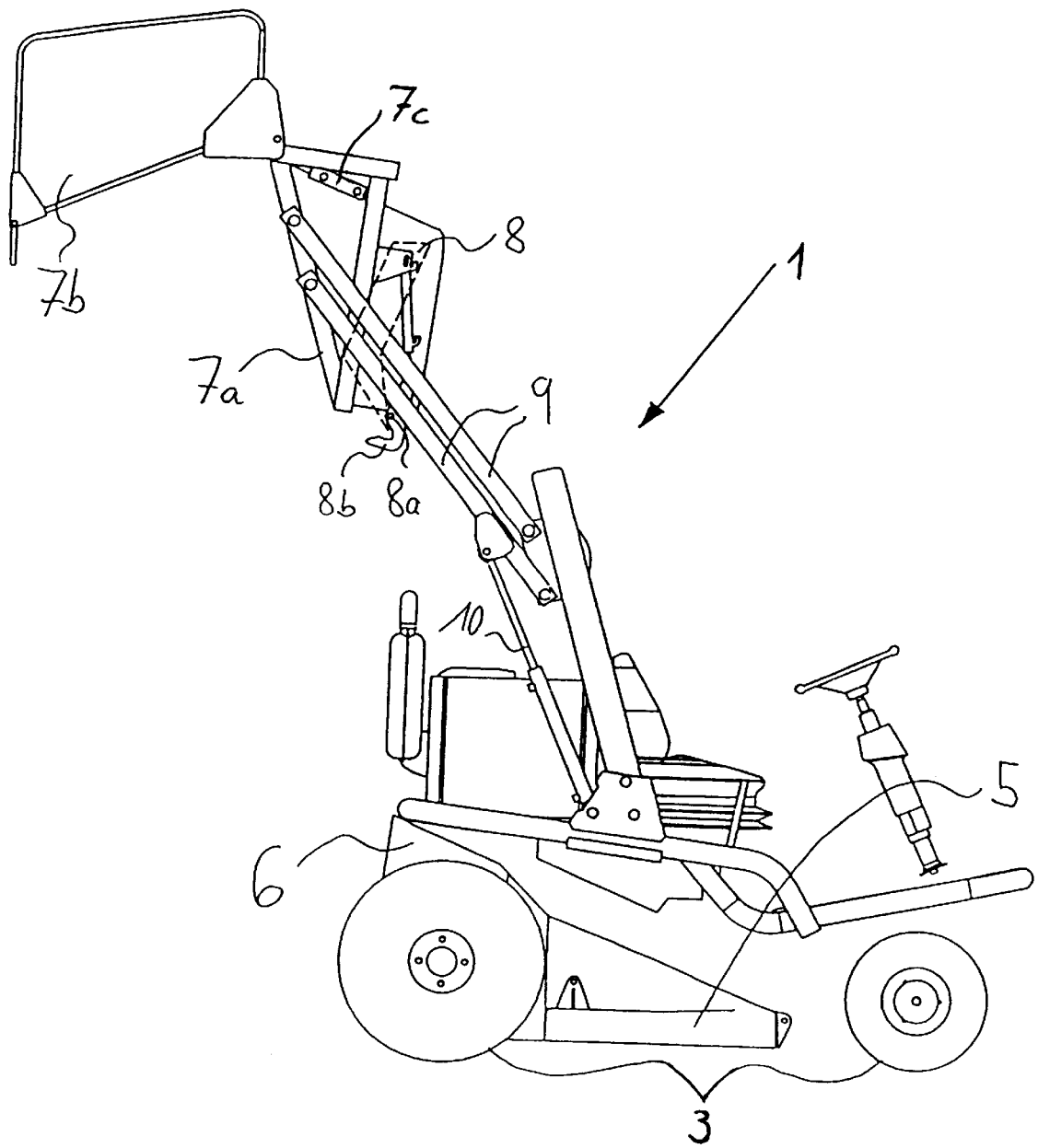

Other characteristics and advantages of the invention will become apparent from the following description of one embodiment given with respect to the schematic drawings, which show:

FIG. 1 a side view of a riding mower in mowing position whose connection conduit is shown in cross section;

FIG. 2 the action of closing the flap of the driving mower according to FIG. 1;

FIG. 3 the riding mower of FIG. 1 whose collector is in the upper position;

FIG. 4 the riding mower of FIG. 1 whose collector is in the upper and open position, and FIG. 5 a fragmentary side view of the forward portion of the driving mower of FIG. 1 provided with an attached front tool.

In FIG. 1, there is seen a riding mower 1 which is driven by a motor 2 and which travels on its wheels 3 over the ground to be mowed. It has a seat 4 on which the driver sits during mowing to drive the riding mower. Below the driver's seat 4 is located the cutting device 5 which has two blades turning in opposite directions and disposed side by side in the direction of advance. The direction of rotation of the rotatable blades is such that they turn forwardly on the sides of the cutting device, whilst they turn rearwardly at the middle. This moves the cut grass taken up by the cutting device rearwardly, into a connection conduit 6, then from the latter into a collector 7 which is mounted on the rear of the riding mower 1. The connection conduit 6 extends between the cutting device 5 and the collector 7, roughly in the space between the rear wheels 3, given that in width, it does not exceed the latter and that its longitudinal extent corresponds approximately to their diameter. It is located below the motor 2 disposed rearwardly of the driver's seat 4. The rear wheel axle can pass through the connection conduit 6. Instead of that, the rear wheels can be mounted cantilever fashion on a cross beam which extends beyond the connection conduit, or can be mounted on the chassis of the mower, given that the drive of the wheels can be effected by independent hydraulic motors.

The important thing is thus that the bottom of the connection conduit 6 will be comprised during mowing by a flap 8 whose rear end is fixed on the collector 7 so as to be able to pivot about a horizontal axis 8a. The flap extends in the direction of advance between the frame of the cutting device 5 and the collector 7 and in the transverse direction, over all the width of the connection conduit 6. Its front end bears movably against the cutting device 5 or against its frame, so that its position on this latter can be modified in case of adjustment of the cutting height of the cutting device 5.

The flap 8 forming the bottom of the connection conduit 6 extends, as to its top, from the cutting device 5 upwardly, in the direction of the collector 7. This guarantees that the cut grass will enter as high as possible into the collector 7, such that there is no need to prevent plugging. In contrast to the top of the connection conduit 6, the flap 8 according to the invention can however have a downward bend in its rear portion and thus, on the one hand, enlarge the capacity of the assembly of the collector device and, on the other hand, prevent cut grass from slide from the rear of the collector 7 toward the cutting device 5, even when the cutting device is not in operation. The downwardly elbowed construction of the rear portion of the flap 8 is possible, because, to disconnect the collector 7 from the connection conduit 6, the flap is turned down in the direction of this latter. Thus, this permits ensuring that the cut grass gathered in the rear portion of the connection conduit 6 will be pushed into the collector 7.

FIG. 2 shows the pivoting of the flap 8 about its horizontal axis which is located on the lower edge of the collector 7 which is directed toward the connection conduit 6. As will be seen in the drawing, on this occasion not only the cut grass located behind the oppositely-brushing point of the flap 8 is compacted in the collector as described above, but also the essential portions of the connection conduit 6 are freed of cut grass. This involves its walls over which passes the flap when it pivots and which disengages the cut grass adhering thereto. Moreover, once the collector 7 is detached, there is no longer any cut grass on the bottom of the connection conduit 6, given that the latter is formed by the flap 8 which, after having pivoted, moves the rest of the cut grass which adhere to it into the collector 7. The connection conduit 6 is downwardly open when the flap 8 is in closed position.

Moreover, FIG. 2 shows that the flap 8 has a hook 8b, and this preferably opposite its pivotal axis 8a. This hook maintains the collector 7 in closed position during operation of the mower, whereas when the flap pivots upwardly, it does not free this lock until preferably at the end of pivoting movement, so that the collector can open and be emptied, which will be described further on in connection with FIG. 4.

In FIG. 3, the collector 7 has pivoted upwardly under the influence of an upper emptying device formed by parallelogram lever arms 9 and jacks 10. There will be seen here particularly the essential advantage of the flap constructed according to the invention, given that the flap 8 effectively prevents cut grass from falling from the collector 7, even when the latter is detached from the connection conduit 6. To this end, the flap 8 is tightly applied against the edges of the opening of collector 7 which has connected this latter to the conduit 6. Then, when it is raised, the collector 7 will always be behind the rest of the riding mower 1, but no longer slightly above the ground, but at a level located above the driver's seat 4.

In FIG. 4, the collector 7 is shown in the open condition. To open it, its rear portion 7b is pivoted by 90° relative to the fixed frame 7a, about a horizontal axis extending transversely to the direction of advance of the riding mower 1 and located above the collector, whereupon the collector opens over all the section. This takes place with the help of a jack 7c which is also located above the collector. However, the flap 8 remains in closed position. Of course, it would also be possible to provide for emptying the collector by opening this flap and causing to pivot the assembly of the collector 7.

Generally speaking, it should be noted that it is of course also within the scope of the invention that the flap act at the front end of the connection conduit, that the connection conduit has a whole, as well as the collector, serve to collect cut grass and that this latter pivot at the same time as the flap to emptying the cutting device, distancing itself from the cutting device.

All the constructions according to the present invention permit sealing reliably the collector at the level of its opening communicating with the cutting device, and thereby guaranteeing several possibilities to manipulate the collector, without risk of the cut grass falling from this latter. Moreover, the flap according to the invention can very advantageously serve as means to open the connection conduit.

FIG. 5 of the accompanying drawings shows the adaptation, in the front portion of the mower, to a front arrangement 11 for mounting attached tools 12, such as a sweeper, a snow plow or a front blade. In the embodiment shown in FIG. 5, the added tool 12 is in the form of a broom whose movements and/or placing in or out of service are controlled by the driver by means of a centralized control and are ensured by hydraulic, pneumatic or mechanical means 13 connected as the case may be to the central pneumatic or hydraulic distribution device of the mower or to a mechanical control. Such a broom 12 can be provided, as shown in FIG. 5, with a receptacle 14 for receiving debris projected by the rotating brush 15.

The front arrangement 11 permits transforming the mower into a multi-use machine which can be used to other tasks over large areas, even apart from periods of mowing, namely for sweeping or snow plowing, even over small streets. As a result, the usefulness of the mower, in terms of the times during the year when it can be used, is particularly improved.

In the case of using a sweeper 12 with a rotating brush 15 driven by a hydraulic or pneumatic or mechanical motor, this latter can preferably be provided with a means 16 for sucking up the swept debris consisting of a fan extending forwardly and above the rotating brush 15, this fan being also driven hydraulically, pneumatically or mechanically, sucking up said debris directly into the sweeping position and propelling the debris through a connection conduit 17 into the collector. So as to avoid throwing up dust about the collector, this latter is then preferably provided, at its junction with the connection conduit to the fan, with a means for filtering and precipitating the dust, in the form of a plate filter or centrifuge.

Moreover, FIG. 5 of the accompanying drawings shows another characteristic of the invention, according to which the steering column 18 of the mower can be provided with means 19 and 20 for adjusting the inclination and height of the steering column. To this end, FIG. 5 shows the steering column 18 in its two end positions of pivoting and the flap in its two end positions of height adjustment.

The means 19 for adjusting the inclination of the steering column 18 can be in the form of a circular sector, not shown, provided with a post fixed to the inside of the casing 21 of said steering column 18, on a chassis element of the mower, and coacting with a gripping device secured to the casing 21 and actuated by a lever 22 or the like mounted on the outside of the casing 21, this latter and the steering column 18 being mounted on the chassis with the possibility of pivoting in a vertical plane about a longitudinal axis. Thus, the steering column 18, with its casing 21, can be pivoted between the end positions shown in FIG. 5 and can be fixed in the one most suitable to the driver.

The means 20 for height adjustment of the steering column 18 is preferably constituted by a gripping fixing device (not shown) provided on a guide sleeve of an upper sliding element of the steering column, said device being actuated by means of a manipulating lever 23 provided on the casing 21 of the steering column 18.

The means 19 and 20 for adjustment in inclination and in height of the steering column 18 and their constituent parts are not shown in detail in FIG. 5 and will not comprise the subject of a detailed description, their principles of operation and of embodiment being completely and easily accessible to one skilled in the art.

Thus it is possible to proceed rapidly and easily to optimum adjustment of the driving position permitting the user to work under ideal ergonometric conditions.

Thanks to the invention, it is possible to provide a riding lawnmower permitting satisfying difficult conditions of emptying the collector, namely directly into receptacles with a high upper edge, and whose field of use can be extended beyond simple mowing, by the use of attached tools.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. In a riding mower (1) comprising a cutting device (5) which moves cut grass through a rearwardly extending connection conduit (6) into a rear collector (7) for cut grass, and wherein for emptying, the collector (7) is pivotally mounted and adapted to be detached from the connection conduit (6) and a movable flap (8) disposed in the region of the connection conduit (6) the flap (8) being mounted on the collector (7) and upon disengagement of the collector (7) from the connection conduit (6) and pivoting the collector (7), the flap (8) can be moved into a position closing the collector (7), and a device for bodily vertically moving the collector (7) for raised unloading of the collector (7).

2. A riding mower according to claim 1, wherein the frame (7*a*) fits an adjacent end of the connection conduit (6).

3. a riding mower according to claim 1, wherein the shape of the flap (8) substantially corresponds to a portion of an internal cross section of the connection conduit (6).

4. A riding mower according to claim 1, wherein during operation of the mower, the flap (8) is movably applied with a free end of the flap against the connection conduit (6) or against a frame of the cutting device.

5. A riding mower according to claim 1, wherein a mechanism for moving the flap is disposed on the collector (7).

6. A riding mower according to claim 1, wherein during operation of the mower, the flap (8) serves as a side wall of the connection conduit (6).

7. A riding mower according to claim 1, wherein the flap (8) is pivotally mounted on an lower edge of the outlet opening of the collector (7).

8. A riding mower according to claim 1, wherein the device for raised unloading is comprised by parallelogram lever arms (9) having jacks (10) to operate them.

9. A riding mower according to claim 1, wherein the flap (8) swings upwardly and rearwardly.

10. A riding mower according to claim 1, wherein the collector (7) is comprised by a frame (7*a*) and a rear portion (7*b*) that can be disengaged from the frame upon causing the collector to pivot.

11. A riding mower according to claim 10, wherein the rear portion (7*b*) is mostly comprised by a material permeable to air.

12. A riding mower according to claim 1, having also a steering column (18) provided with means (19, 20) for adjusting the steering column in inclination and in height.

13. A riding mower according to claim 12, wherein the means (19) for adjustment in inclination of the steering column (18) is in the form of a circular sector provided with a post fixed within a casing (21) of said steering column (18), on a frame member of the mower, and coacting with a gripping device secured to the casing (21) and actuated by a lever (22) mounted on the outside of the casing (21), the casing (21) and the steering column (18) being mounted on a chassis of the mower for pivotal movement in a vertical plane about a longitudinal axis of the mower.

14. A riding mower according to claim 12, wherein the means (20) for adjusting the height of the steering column (18) is comprised by a gripping device provided a guide sleeve of an upper sliding element of the steering column (18), said device being actuated by means of a manipulating lever (23) provided on the casing (21) of the steering column (18).

15. A riding mower according to claim 1, also having a front device (11) for mounting auxiliary tools (12).

16. A riding mower according to claim 15, wherein the tool (12) is a sweeper provided with a receptacle (14) for receiving debris projected by a rotatable brush (15).

17. A riding mower according to claim 16, wherein the sweeper is a rotatable brush (15) driven by a motor and has means (16) for sucking up swept debris comprising a fan extending forwardly and above the rotatable brush (15), and a connection conduit (17) for directing said debris into the collector.

* * * * *